(12) United States Patent
Gonda et al.

(10) Patent No.: US 6,226,432 B1
(45) Date of Patent: May 1, 2001

(54) ENDOSCOPIC OPTICAL FIBER BUNDLE

(75) Inventors: Kazuhiko Gonda; Kikuo Iwasaka; Ryoichi Baba; Hitoshi Hirose, all of Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/492,134

(22) Filed: Jan. 27, 2000

(30) Foreign Application Priority Data

Jan. 27, 1999 (JP) .................................................. 11-018169

(51) Int. Cl.$^7$ ....................................................... G02B 6/06
(52) U.S. Cl. .............................. 385/117; 385/115; 606/15; 600/182
(58) Field of Search ..................................... 385/117, 115, 385/100, 116, 109, 113; 606/15, 16; 600/182, 109, 160, 101

(56) References Cited

U.S. PATENT DOCUMENTS

| 4,784,464 | 11/1988 | Ouchi | 385/117 |
| 5,073,048 | 12/1991 | Adachi et al. | 385/115 |
| 5,812,719 | * | 9/1998 | Barry et al. | 385/115 |

FOREIGN PATENT DOCUMENTS 10111463    4/1998  (JP) .

* cited by examiner

*Primary Examiner*—Phan T. H. Palmer
(74) *Attorney, Agent, or Firm*—Greenblum & Bernstein, P.L.C.

(57) ABSTRACT

In an endoscopic optical fiber bundle, cutouts (15a) are formed near an end portion of helical tube (15) and the area with the cutouts is placed over socket (12), with a string-like member (16) being passed through the cutouts (15a) to be wound onto the outer surface of the helical tube (15) so that the socket (12) is tightly bound to the helical tube 15.

12 Claims, 5 Drawing Sheets

ENDOSCOPIC OPTICAL FIBER BUNDLE

BACKGROUND OF THE INVENTION

The present invention relates to an endoscopic optical fiber bundle comprising a bundle of optical fibers passed through the insertion portion of an endoscope.

If an endoscopic optical fiber bundle is simply passed as such through the insertion portion of an endoscope (i.e., without any protective sheath), the fibers will get stuck in various areas and break. To deal with this problem, the bundle is sheathed in a flexible tube except in a socket at the end portion.

However, typically in the curved portion of an endoscope that is bent in various directions by remote control, the optical fiber bundle is frequently bent in unspecified directions with small radii of curvature; the resulting strong cyclic flexural stress causes the sheath tube to tear at the boundary with the socket and the sheathed optical fibers may often bend to failure.

An idea to cope with this difficulty is to reinforce the flexible sheath tube over the optical fiber bundle by surrounding it with a helical tube of metal strip at least in the area within the curved portion of an endoscope.

FIG. 6 shows an end and the nearby portion of an endoscopic optical fiber bundle that adopts the above-stated idea. End portions of many optical fibers 91 in bundle are secured into a tubular socket 92.

The optical fibers 91 in bundle are sheathed in a flexible tube 93 an end of which is tightly bound onto the socket 92 which, in turn, is surrounded with a helical tube 94. An end of the helical tube 94 is inserted into a tube 95 tightly bound to the socket 92 and the inserted helical tube 94 is securely joined to the tube 95.

The problem with the endoscopic optical fiber bundle shown in FIG. 6 is that as it is bent repeatedly during the use of the endoscope, the fixed tube 95 is rubbed intensely by the tip of the helical tube 94 and may sometimes tear (in area A).

Then, the intense cyclic flexural stress is concentrated at the boundary (area B) between the sheath tube 93 and the socket 92 until the former tears in that area, causing failure of the optical fibers 91.

SUMMARY OF THE INVENTION

An object, therefore, of the invention is to provide a durable endoscopic optical fiber bundle in which a helical tube installed around a sheath tube is positively secured to a socket to ensure that the optical fibers will not bend to failure during repeated use of the endoscope.

To attain the above-noted object, the present invention provides an arrangement for securing coupling a helical tube to a socket. The helical tube surrounding a sheath tube is securely coupled to the socket, so even if the curved portion of an endoscope is repeatedly bent, the helical tube remains securely coupled to the socket so that the helical tube bears the greater part of the strong cyclic flexural stress. Hence, the sheath tube will not tear at the boundary with the socket and none of the optical fibers will bend to failure.

An endoscopic optical fiber bundle according to an embodiment has a bundle of optical fibers passed through the insertion portion of an endoscope. At least one end portion of the bundle is secured within a tubular socket and sheathed in a flexible sheath tube fixed at an end to the socket. At least a part of the sheath tube is surrounded with a helical tube made up of a metal strip that is spirally wound in a specified diameter. Cutouts are formed near an end portion of the helical tube, and the area with the cutouts is placed over the socket. A string-like member is passed through the cutouts to be wound onto the outer surface of the helical tube so that the socket is tightly bound to the helical tube. If desired, the string-like member may be wound to pass through grooves formed in the outer peripheral surface of said socket.

An endoscopic optical fiber bundle according to another embodiment has a bundle of optical fibers passed through the insertion portion of an endoscope. At least one end portion of the bundle is secured within a tubular socket and sheathed in a flexible sheath tube fixed at an end to the socket. At least a part of the sheath tube is surrounded with a helical tube made up of a metal strip that is spirally wound in a specified diameter. The socket has a flange portion against which an end of the helical tube is allowed to abut, and the helical tube is fused to the socket in the abutting area. If desired, the fusion may be achieved by laser welding.

In either type of endoscopic optical fiber bundle, the helical tube may constructed of spaced turns of the strip, and the individual spaces between the adjacent turns may be filled with a flexible adhesive. If desired, the helical tube may at least be positioned in the curved portion of an endoscope.

The present disclosure relates to the subject matter contained in Japanese patent application No. Hei. 11-18169 (filed on Jan. 27, 1999), which is expressly incorporated herein by reference in its entirety.

DESCRIPTION OF THE PREFERRED EMBODIMENT

Embodiments of the invention are described below with reference to FIGS. 1–5.

Figure 4:
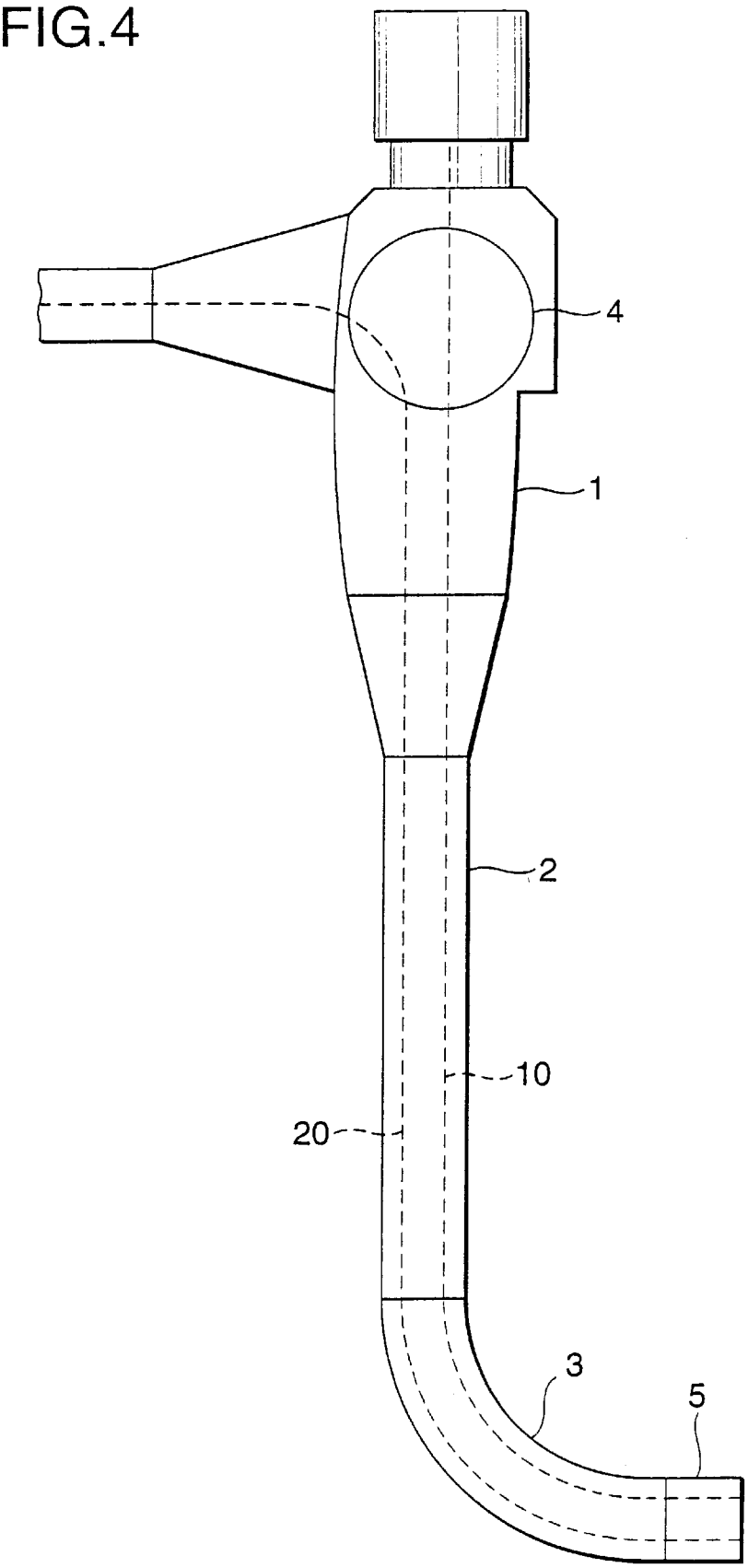
FIG. 4 is a sketch showing the exterior of an endoscope.

FIG. 4 is a sketch of an endoscope. It has a manipulating section 1 coupled to a flexible tube 2 of the insertion portion which, in turn, is coupled at the distal end to a curved portion 3 which can be bent in any desired direction through a desired angle by rotating a manipulation knob 4 fitted on the manipulating section 1.

The distal end of the curved portion 3 is coupled to the body of a distal end portion 5 containing objective optics (not shown) and other components as built-in parts. An image transmitting optical fiber bundle 10 and an illuminating optical fiber bundle 20 are passed through the curved portion 3 and the flexible tube 2 to be fixed at their distal ends to the body of distal end portion 5.

Figure 1:
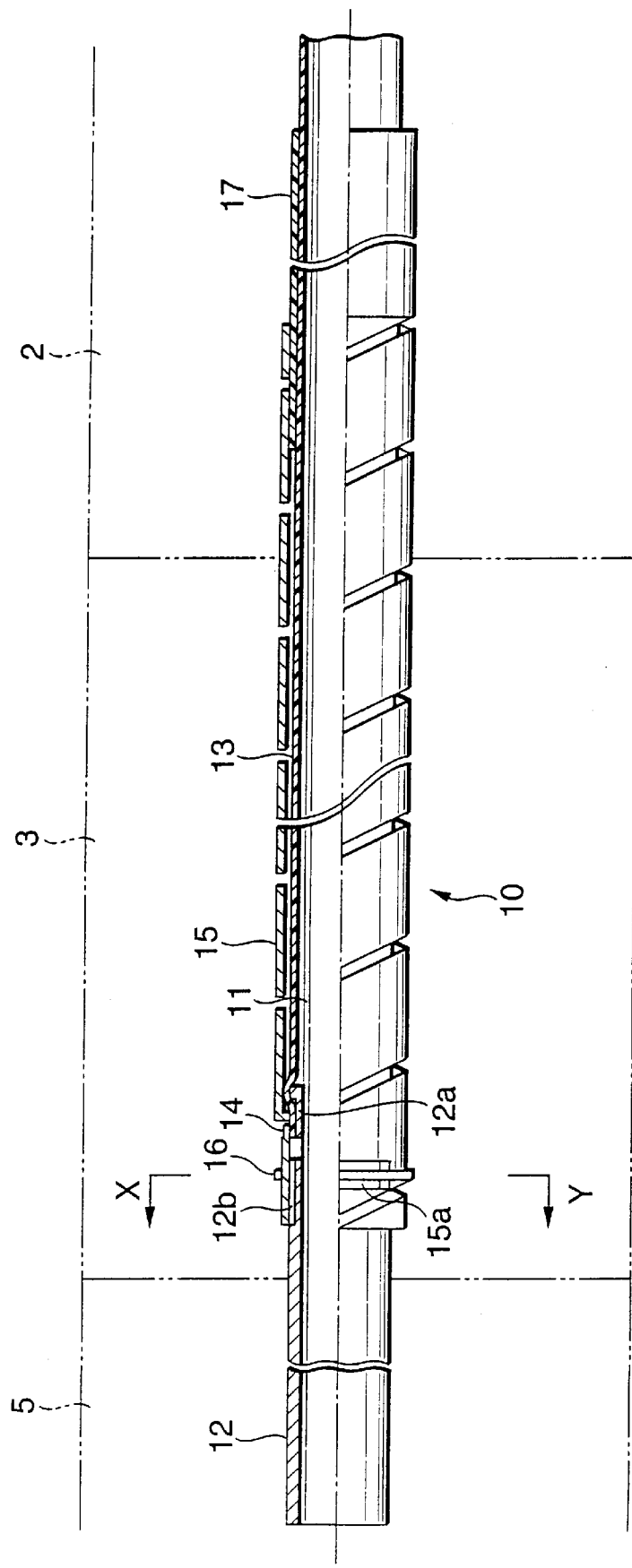
FIG. 1 is a longitudinal section, with a half taken away, of the distal end portion of an endoscopic optical fiber bundle according to the first embodiment of the invention.

FIG. 1 shows the distal end and the nearby area of the image transmitting optical fiber bundle 10. End portions of many optical fibers 11 in bundle are inserted into a metal socket 12 in pipe form and fixed therein with the aid of an adhesive. The distal end faces of the fibers 11 are made flat by polishing. The socket 12 is inserted into the body of distal end portion 5 from the rear side and fixed in position.

Indicated by 13 is a flexible sheath tube, typically a silicone rubber tube, that covers the entire length of the optical fibers 11. The distal end portion of the sheath tube 13 is tightly bound to a first circumferential groove 12a in the outer peripheral surface of the socket 12 near its rear end by means of a first string-like member 14.

In the area where it is located in the curved portion 3, the sheath tube 13 is surrounded with a helical tube 15. The helical tube 15 is typically made of a stainless steel strip which is spirally wound in a specified diameter, with adjacent turns of the strip being spaced apart.

The helical tube 15 is so sized that it is loosely fitted over the sheath tube 13 leaving some clearance between the two members. The rear end portion of the helical tube 15 is slightly recessed into the flexible tube 2 of the insertion portion of an endoscope. In the overlapping area, a short spacer tube 17 is fitted over the outer circumference of the sheath tube 13 to eliminate radial play of the helical tube 15.

Figure 2:
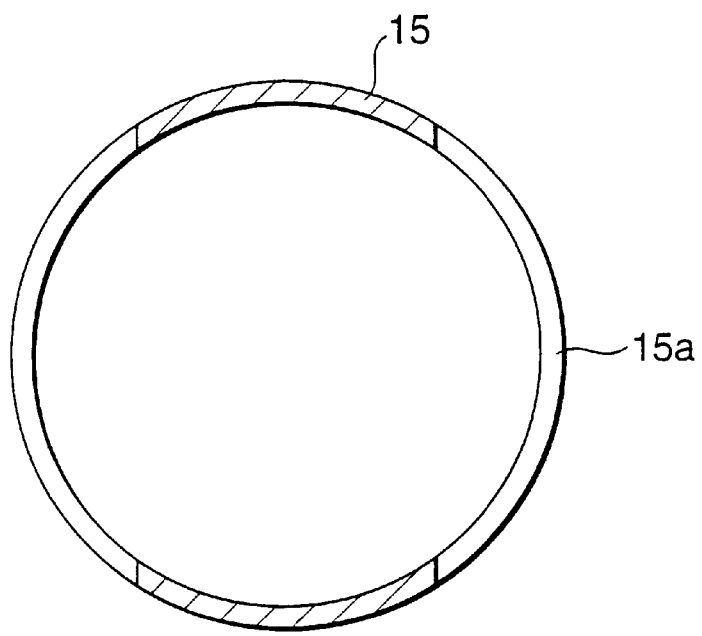
FIG. 2 is section X-Y of the helical tube in the first embodiment of the invention.

At least one cutout 15a is formed in the helical tube 15 in areas near its distal end portion. FIG. 2 is section X-Y of the sheath tube 15 as taken through the cutouts 15a; obviously, two cutouts 15a are formed on the same circumference diametrically and symmetrically with each other. Although the provision of only one cutout 15a is useful to fix the helical tube 15 to the socket 12 with a string-like member 16 (later described), the provision of plural cutouts arranged on the same circumference or arranged symmetrically makes it possible to strengthen the fixing of the helical tube 15 to the socket 12 with the string-like member 16.

As shown in FIG. 1, the socket 12 has a second circumferential groove 12b adjacent the first circumferential groove 12a and the distal end portion of the helical tube 15 is covered with the socket 12, making sure that the cutouts 15 are in registry with the second circumferential groove 12b.

Figure 3:
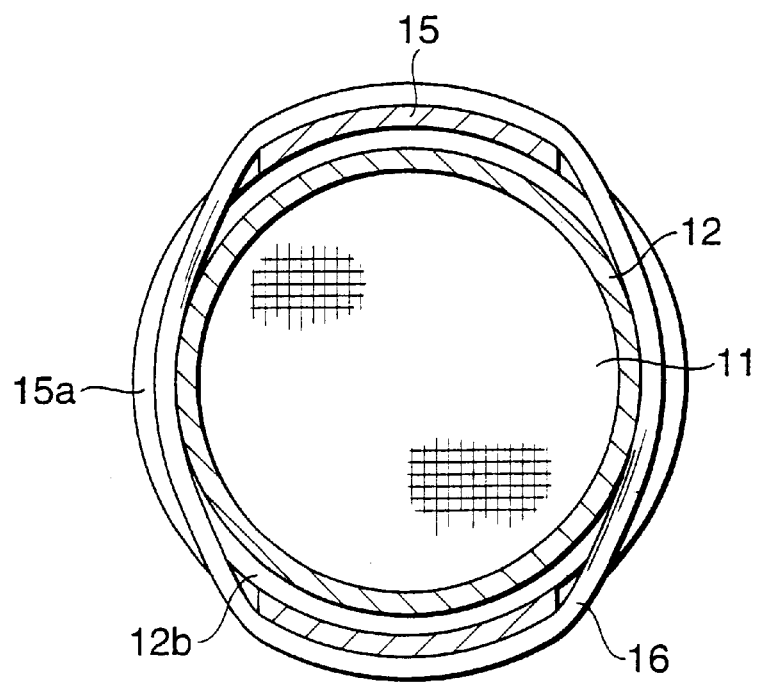
FIG. 3 is section X-Y of the endoscopic optical fiber bundle according to the first embodiment of the invention.

As shown in FIG. 3 which is also section X-Y of FIG. 1, a second string-like member 16 is passed through the cutouts 15a to be tightly wound onto the outer circumference of the helical tube 15, whereby the latter is securely bound to the socket 12. That part of the helical tube 15 which is bound with the second string-like member 16 is elastically reduced in diameter and its reverting force prevents the second string-like member 16 from coming loose.

In practice, the spaces in the helical tube 15 that exist between adjacent turns of the strip are filled with a flexible adhesive such as a silicone-based adhesive although this is not shown.

If the curved portion 3 of an endoscope is bent repeatedly during its use, the helical tube 15 remains securely coupled to the socket 12 so that it bears the greater part of the strong cyclic flexural stress; hence, the sheath tube 13 will not tear at the boundary with the socket 12 and none of the optical fibers 11 will fail.

The second string-like member 16 acts like a clamp on the bottom of the second circumferential groove 12b in the socket 12 and will not be dislodged from the groove even if its binding force somewhat relaxes.

The strength of coupling between the helical tube 15 and the socket 12 can be further increased if they are joined with an adhesive applied to the binding area, particularly between the inner periphery of the helical tube 15 and the socket 12.

The pitch of turns in the helical tube 15 may be varied progressively to achieve gradual relief of the flexural stress developing in the helical tube 15.

Figure 5:
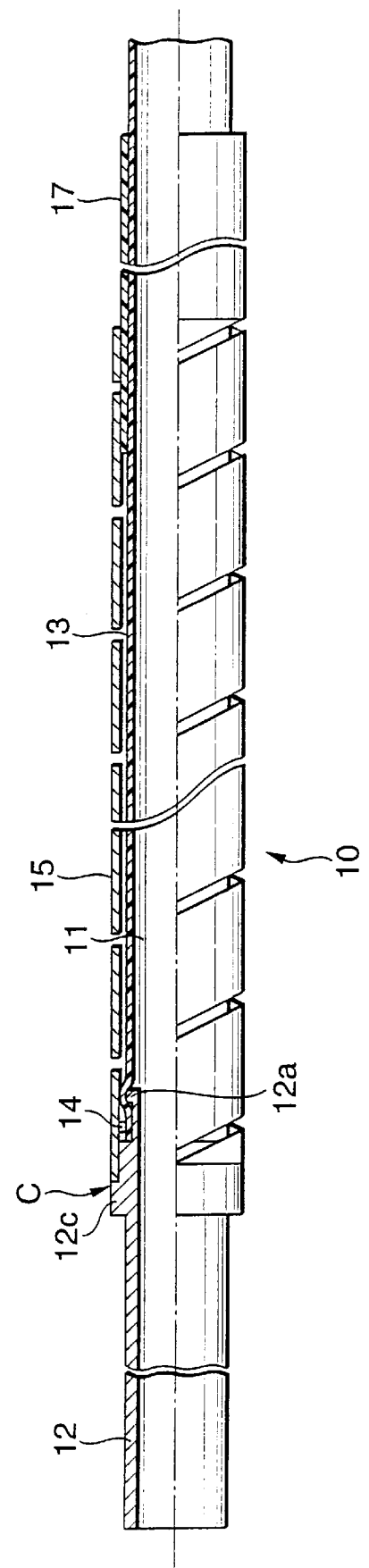
FIG. 5 is a longitudinal section, with a half taken away, of the distal end portion of an endoscopic optical fiber bundle according to the second embodiment of the invention.
Figure 6:
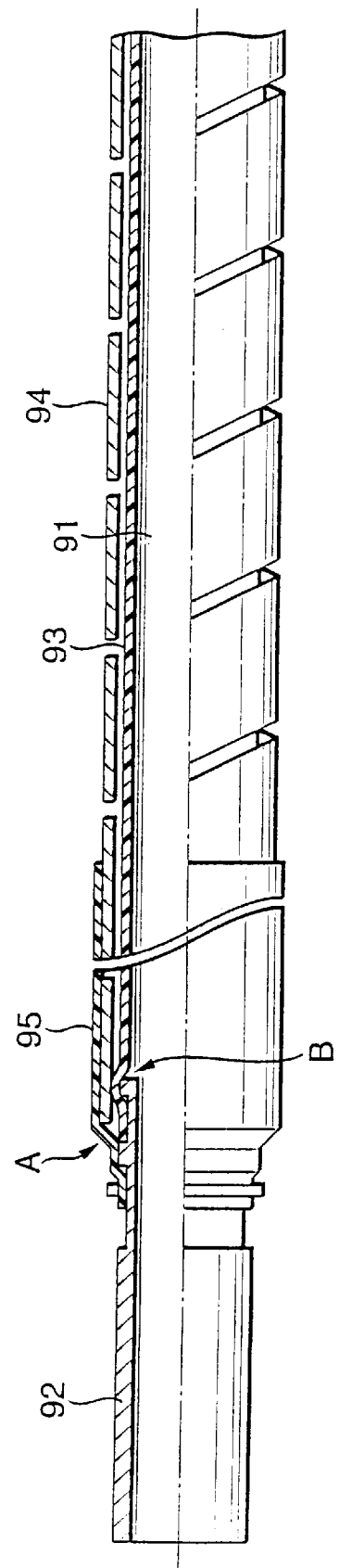
FIG. 6 is a longitudinal section, with a half taken away, of the distal end portion of a conventional endoscopic optical fiber bundle.

FIG. 5 shows the image transmitting optical fiber bundle 10 according to the second embodiment of the invention, which is essentially the same as the image transmitting optical fiber bundle 10 in the first embodiment except in terms of the design in securely coupling the helical tube 15 to the socket 12.

As shown, the socket 12 has a flange portion 12c adjacent the circumferential groove 12a formed near the rear end of the socket 12. The distal end of the helical tube 15 is allowed to abut against the flange portion 12c and in the abutting area (area C) the helical tube 15 is fused, typically by laser welding, and coupled to the socket 12.

In this way, the helical tube 15 can be coupled most securely to the socket 12 by a very simple procedure to ensure that none of the optical fibers 11 will bend to failure.

The present invention is by no means limited to the two specific embodiments described above and the concept of the invention may be applied to the illuminating optical fiber bundle 20.

What is claimed is:

1. An endoscopic optical fiber bundle comprising:
   a bundle of optical fibers adapted to pass through an insertion portion of an endoscope;
   a tubular socket to which at least one end portion of said bundle is inserted and secured;
   a flexible sheath tube covering said bundle and having an end fixed to said socket;
   a helical tube surrounding at least a part of said sheath tube, said helical tube being made up of a metal strip that is spirally wound in a specified diameter;
   at least one cutout formed through said helical tube and located over said socket; and
   a string member passed through said at least one cutout to be wound onto outer surfaces of said helical tube and said socket.

2. The endoscopic optical fiber bundle according to claim 1, wherein said outer surface of said socket has a groove receiving said string member.

3. The endoscopic optical fiber bundle according to claim 1, wherein said helical tube is in direct contact with the socket.

4. The endoscopic optical fiber bundle according to claim 1, wherein said at least one cutout includes two cutouts which are diametrically opposite from each other.

5. The endoscopic optical fiber bundle according to claim 1, wherein said helical tube is constructed of spaced turns of the strip, and individual spaces between adjacent turns are filled with a flexible adhesive.

6. The endoscopic optical fiber bundle according to claim 1, wherein said helical tube is at least positioned in a curved portion of an endoscope.

7. An endoscopic optical fiber bundle comprising:
   a bundle of optical fibers adapted to pass through an insertion portion of an endoscope;
   a tubular socket to which at least one end portion of said bundle is inserted and secured;
   a flexible sheath tube covering said bundle and having an end fixed to said socket;
   a helical tube surrounding at least a part of said sheath tube, said helical tube being made up of a metal strip that is spirally wound in a specified diameter;
   a flange portion protruded from said socket and welded to an end of said helical tube.

8. The endoscopic optical fiber bundle according to claim 7, wherein said helical tube is at least positioned in a curved portion of an endoscope.

9. The endoscopic optical fiber bundle according to claim 7, wherein said flange portion is welded to said end of said helical tube by laser welding.

10. The endoscopic optical fiber bundle according to claim 7, wherein said helical tube is in direct contact with the socket.

11. The endoscopic optical fiber bundle according to claim 7, wherein said helical tube is constructed of spaced turns of the strip, and individual spaces between adjacent turns are filled with a flexible adhesive.

12. The endoscopic optical fiber bundle according to claim 1, wherein said at least one cutout includes two cutouts which are arranged on the same circumferential line.

* * * * *